United States Patent
Lee et al.

(10) Patent No.: US 8,953,477 B2
(45) Date of Patent: Feb. 10, 2015

(54) METHOD OF RECEIVING AND TRANSMITTING MESSAGE IN A MOBILE COMMUNICATION SYSTEM USING A MTC DEVICE AND APPARATUS FOR THE SAME

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 13/522,282

(22) PCT Filed: Feb. 9, 2011

(86) PCT No.: PCT/KR2011/000834
§ 371 (c)(1),
(2), (4) Date: Jul. 13, 2012

(87) PCT Pub. No.: WO2011/099753
PCT Pub. Date: Aug. 18, 2011

(65) Prior Publication Data
US 2012/0300655 A1    Nov. 29, 2012

Related U.S. Application Data

(60) Provisional application No. 61/302,927, filed on Feb. 9, 2010.

(30) Foreign Application Priority Data

Feb. 1, 2011    (KR) .......................... 10-2011-0010156

(51) Int. Cl.
*H04W 24/00*    (2009.01)
*H04W 76/04*    (2009.01)
*H04W 68/00*    (2009.01)
(Continued)

(52) U.S. Cl.
CPC ............ *H04W 24/00* (2013.01); *H04W 76/048* (2013.01); *H04W 68/005* (2013.01); *H04W 4/12* (2013.01); *H04W 52/0216* (2013.01); *H04W 68/00* (2013.01); *Y02B 60/50* (2013.01)
USPC .......................... 370/252; 370/311; 455/458

(58) Field of Classification Search
CPC ..... H04W 4/00; H04W 52/0216; H04W 4/12; H04W 68/00; H04W 68/005; H04W 52/0209; H04W 52/0212; H04W 52/00; H04W 76/048; Y02B 60/50
USPC ................................... 370/252, 311; 455/458
See application file for complete search history.

(56) References Cited

U.S. PATENT DOCUMENTS 7,676,214 B2 *    3/2010    Homchaudhuri .......... 455/343.1
8,606,304 B2 *    12/2013   Iwamura et al. .............. 455/458
(Continued)

FOREIGN PATENT DOCUMENTS

| WO | WO 2009/038367 A1 | 3/2009 |
|---|---|---|
| WO | WO 2009035060 A1 * | 3/2009 |
| WO | WO 2011087233 A2 * | 7/2011 |

OTHER PUBLICATIONS

"Extended Paging Cycles," Nokia Siemens Networks, Nokia, Ericsson, ST-Ericsson, Interdigital,May 16-20, 2011, 3GPP TSG SA WG2 Meeting #85.*

*Primary Examiner* — Mark Rinehart
*Assistant Examiner* — Kenneth P Hunt
(74) *Attorney, Agent, or Firm* — Birch, Stewart, Kolasch & Birch, LLP

(57) ABSTRACT

A method of receiving a message by a wireless device in a mobile communication system is disclosed. The present invention comprises obtaining information of a first cycle, the first cycle including a monitoring interval and a non-monitoring interval; and monitoring at least one active occasion within the monitoring interval for receiving the message, wherein the message is repeated within the monitoring interval.

11 Claims, 6 Drawing Sheets

(51) Int. Cl.
*H04W 52/02* (2009.01)
*H04W 4/12* (2009.01)

(56) References Cited

U.S. PATENT DOCUMENTS

| | | | |
|---|---|---|---|
| 8,666,393 B2 * | 3/2014 | Faronius et al. | 455/426.1 |
| 8,750,154 B2 * | 6/2014 | Kim et al. | 370/252 |
| 2008/0214249 A1 * | 9/2008 | Kim et al. | 455/574 |
| 2009/0319903 A1 | 12/2009 | Alanara | |
| 2011/0287740 A1 * | 11/2011 | Vos et al. | 455/410 |
| 2013/0044659 A1 * | 2/2013 | Jokimies et al. | 370/311 |
| 2013/0301501 A1 * | 11/2013 | Olvera-Hernandez et al. | 370/311 |

* cited by examiner

METHOD OF RECEIVING AND TRANSMITTING MESSAGE IN A MOBILE COMMUNICATION SYSTEM USING A MTC DEVICE AND APPARATUS FOR THE SAME

This application is the National Phase of PCT/KR2011/000834 filed on Feb. 9, 2011 which claims priority under U.S.C. 119(e) to U.S. Provisional Application No. 61/302,927 filed on Feb. 9, 2010 and under 35 U.S.C. 119(a) to Patent Application No. 10-2011-0010156 filed in the Republic of Korea on Feb. 1, 2011, all of which are hereby expressly incorporated by reference into the present application.

TECHNICAL FIELD

The present invention relates to a method of receiving and transmitting a message in a mobile communication system using a MTC device and an apparatus for the same.

BACKGROUND ART

A mobile communication system has been widely developed to provide various kinds of communication services such as voice and data. Generally, the mobile communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

In the mean time, a machine type communication (MTC) device may be used in the mobile communication system. The MTC means communication performed between machines excluding person. At this time, the MTC device is used. Services provided through the MTC device are different from communication services involved with person, and can be applied to various categories.

DISCLOSURE OF INVENTION

Technical Problem

Accordingly, the present invention is directed to a method of receiving and transmitting a message in a mobile communication system using a MTC device and an apparatus for the same, which substantially obviate one or more problems due to limitations and disadvantages of the related art.

An object of the present invention is to provide a method of receiving and transmitting a discontinuous message in a mobile communication system using a MTC device and an apparatus for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method of receiving a message by a wireless device in a mobile communication system includes obtaining information of a first cycle, the first cycle including a monitoring interval and a non-monitoring interval; and monitoring at least one active occasion within the monitoring interval for receiving the message, wherein the message is repeated within the monitoring interval.

Also, the message is repeated in accordance with a second cycle within the monitoring interval.

Also, the first cycle includes a plurality of second cycles, each of second cycles including an active interval and an inactive interval.

Also, the at least one active occasion is included in active intervals of the second cycle.

Also, the monitoring at least one active occasion includes monitoring a physical downlink control channel (PDCCH) for the message.

Also, the PDCCH for the message includes an identifier.

Also, the message is received through a physical downlink shared channel (PDSCH) indicated by the PDCCH for the message.

Also, the first cycle is a DRX (Discontinuous Reception) cycle.

Also, the wireless device is a MTC (Machine Type Communication) device.

Also, the message is a paging message.

In another aspect of the present invention, a method of transmitting a message in a mobile communication system comprises transmitting information of a first cycle to a wireless device, the first cycle including a monitoring interval and a non-monitoring interval; and transmitting a message to the wireless device via at least one active occasion within the monitoring interval, wherein the message is repeated within the monitoring interval.

Also, the message is repeated in accordance with a second cycle within the monitoring interval.

Also, the first cycle includes a plurality of second cycles, each of second cycles including an active interval and an in-active interval.

Also, the at least one active occasion is included in active intervals of the second cycle.

Also, the first cycle is a DRX (Discontinuous Reception) cycle.

Also, the wireless device is a MTC (Machine Type Communication) device.

Also, the message is a paging message.

Advantageous Effects of Invention

According to the embodiments of the present invention, in the mobile communication system that uses an MTC device, power consumption of a wireless device can be minimized and at the same time messages can stably be received and transmitted.

It is to be understood that the advantages that can be obtained by the present invention are not limited to the aforementioned advantage and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. For example, the following description will be made based on, but not limited to, a 3GPP LTE system as an example of a mobile communication system. However, it is to be understood that the following description can be applied to various mobile communication systems such as an IEEE 802.16 system.

First of all, as an example of a mobile communication system to which the present invention is applied, the 3GPP LTE system will be described.

Figure 1:
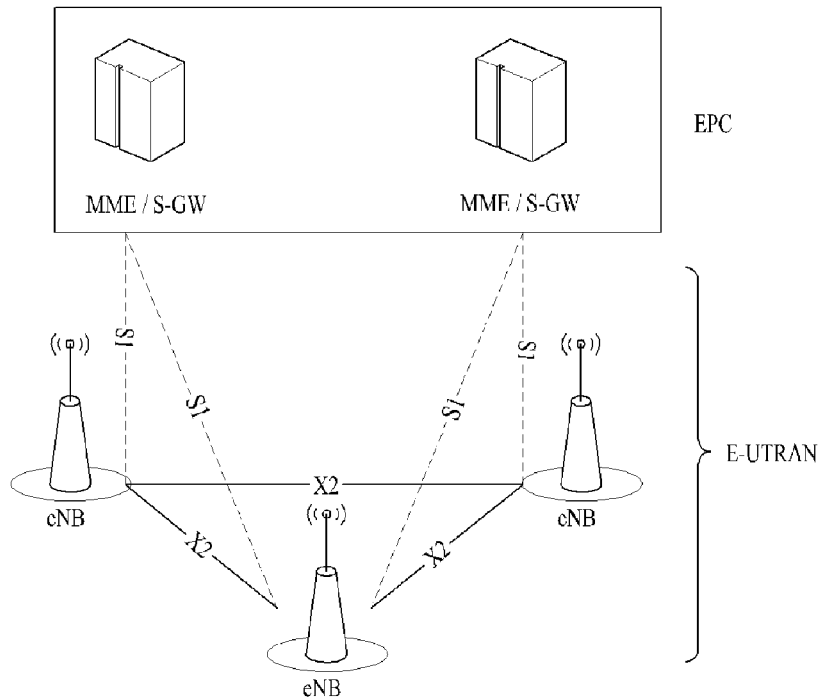
FIG. 1 is a diagram illustrating a structure of an Evolved Universal Mobile Telecommunications System (E-UMTS)

FIG. 1 is a diagram illustrating a structure of an Evolved Universal Mobile Telecommunications System (E-UMTS). The E-UMTS is a system evolving from the conventional UMTS and its basic standardization is currently handled by the 3GPP (3$^{rd}$ Generation Partnership Project). The E-UMTS may also be called an LTE (Long Term Evolution) system. The E-UMTS includes an evolved terrestrial radio access network (E-UTRAN).

The E-UTRAN includes base stations (evolved-NodeB, hereinafter, referred to as eNB), wherein the respective eNBs are connected with each other through X2 interface. Also, each of eNBs is connected with an user equipment (UE) through a radio interface and connected with an EPC (Evolved Packet Core) through S1 interface. The EPC includes a mobility management entity (MME), a serving-gateway (S-GW), and a packet data network-gateway (PDN-GW). The MME includes access information of the UE or ability information of the UE, wherein the access information or the ability information is mainly used for mobility management. The S-GW is a gateway having the E-UTRAN as an end point, and the PDN-GW is a gateway having a PDN as an end point. A control message exchanged between the eNBs through the X2 interface uses X2AP (X2 Application Part) protocol, and may be referred to as an X2AP message. And, a control message exchanged between a MME and an eNB uses S1AP (S1 Application Part) protocol, and may be referred to as an S1AP message.

Layers of a radio interface protocol between the UE and the eNB, can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as RRC) layer located at the third layer plays a role in controlling radio resources between the UE and the network. For this, the RRC layer enables RRC messages to be exchanged between the UE and the eNB.

Figure 2:
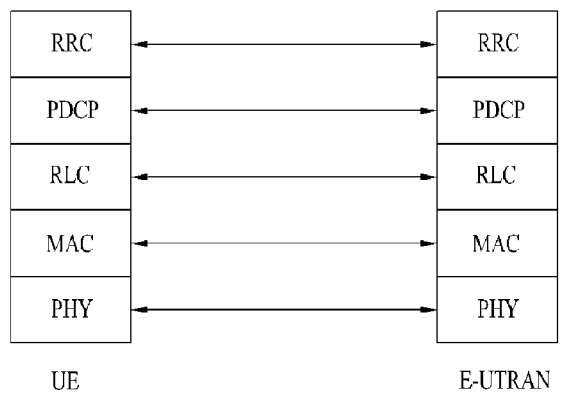
FIGS. 2 and 3 are diagrams illustrating a structure of a radio interface protocol between a user equipment (UE) and E-UTRAN based on the 3GPP radio access network standard to which the present invention is applied.
Figure 3:
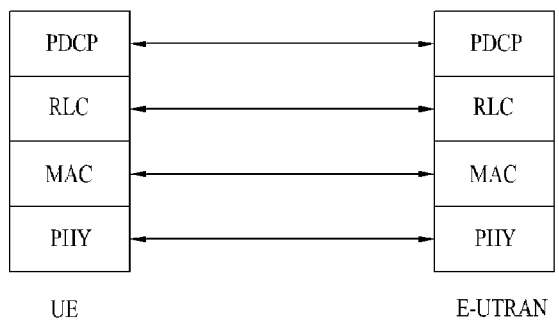

FIGS. 2 and 3 are diagrams illustrating a structure of a radio interface protocol between an user equipment (UE) and an E-UTRAN based on the 3GPP radio access network standard to which the present invention is applied. The radio interface protocol horizontally includes a physical layer, a data link layer, and a network layer, and vertically includes a user plane (U-plane) for data information transfer and a control plane (C-plane) for control signal transfer (signaling transfer). The protocol layers in FIGS. 2 and 3 can be classified into L1 (first layer), L2 (second layer), and L3 (third layer) based on three lower layers of the open system interconnection (OSI) standard model widely known in the communications systems. These radio protocol layers exist in the UE and the E-UTRAN in pairs, and play a role in data transfer of a radio interval.

Hereinafter, the respective layers of the radio protocol control plane of FIG. 2 and the radio protocol user plane of FIG. 3 will be described.

The physical layer as the first layer provides an information transfer service to an upper layer using physical channels. The physical layer is connected to a medium access control (MAC) layer through a transport channel, wherein the MAC layer is located above the physical layer. Data are transferred between the medium access control layer and the physical layer through the transport channel. Moreover, data are transferred between different physical layers, and more particularly, between one physical layer of a transmitting side and the other physical layer of a receiving side through the physical channel. The physical channel is modulated in accordance with an orthogonal frequency division multiplexing (OFDM) scheme, and time and frequency are used as radio resources.

The medium access control (MAC) layer of the second layer provides a service to a radio link control (RLC) layer through a logical channel, wherein the RLC layer is located above the MAC layer. The RLC layer of the second layer supports reliable data transfer. A function of the RLC layer may be implemented as a functional block in the MAC layer. In order to effectively transmit IP packets (e.g., IPv4 or IPv6) within a radio-communication period having a relatively narrow bandwidth, a PDCP layer of the second layer (L2) performs header compression to reduce a header size of the IP packets having unnecessary control information.

A radio resource control (RRC) layer located on the highest part of the third layer is defined in the control plane only and is associated with configuration, reconfiguration and release of radio bearers (RBs) to be in charge of controlling the logical, transport and physical channels. In this case, the RB means a service provided by the second layer for the data transfer between the UE and the E-UTRAN. If RRC connection is established between the RRC layer of the UE and the RRC layer of the E-UTRAN, the UE is in an RRC connected (RRC_CONNECTED) state. If not so, the UE is in an RRC idle (RRC_IDLE) state. The RRC state of the UE and the RRC connection method will be described in more detail. The RRC state means whether the RRC layer of the UE is logically connected with the RRC layer of the E-UTRAN. If the RRC layer of the UE is logically connected with the RRC layer of the E-UTRAN, it means the RRC_CONNECTED state. If not so, it means the RRC_IDLE state. Since RRC connection exists in the UE of the RRC_CONNECTED state, the E-UTRAN can identify the existence of the corresponding UE in a cell unit, and can effectively control the UE. On the other hand, the E-UTRAN cannot identify the UE of the RRC_IDLE state. The UE of the RRC_IDLE state is managed by the EPC in a tracking area unit which is a local unit greater than a cell unit. In other words, only the existence of the UE of the RRC_IDLE state is identified by the grater local unit, and the UE should shift to the RRC_CONNECTED state for the general mobile communication service such as voice and data. When the user first turns on the power of the UE, the UE searches a proper cell and then stays at the RRC idle state in the corresponding cell. When the UE staying in the RRC_IDLE state needs RRC connection, it is RRC connected with the RRC layer of the E-UTRAN through RRC connection establishment procedure and shifts to the RRC_CONNECTED state. When uplink data transmission is required due to call attempt of the user, etc., or to transmit a response message to a paging message received from the E-UTRAN, the UE of the RRC_IDLE state may need RRC connection. In the mean time, examples of downlink transport channels carrying data from the eNB to the user equipment include a broadcast channel (BCH) carrying system information and a downlink shared channel (SCH) carrying user traffic or control messages. Traffic or control messages of a downlink multicast or broadcast service may be transmitted through the downlink SCH or an additional downlink multicast channel (MCH). Also, examples of uplink transport channels carrying data from the user equipment to the eNB include a random access channel (RACH) carrying an initial control message and an uplink shared channel (UL-SCH) carrying user traffic or control message. Examples of logical channels located above the transport channels and mapped with the transport channels include a broadcast control channel (BCCH), a paging control channel (PCCH), a common control channel (CCCH), a multicast control channel (MCCH), and a multicast traffic channel (MTCH).

In the mean time, the aforementioned system information includes essential information required for the UE to access the eNB. Accordingly, the UE should receive the system information before accessing the eNB, and should always have latest system information. Since the system information should be known by all UEs in one cell, the eNB periodically transmits the system information. The system information can be classified into a master information block (MIB), a schedule block (SB), and a system information block (SIB). The MIB notifies the UE of physical configuration (for example, bandwidth) in respect of a corresponding cell. The SB notifies the UE of transport information (for example, transport period) of the SIBs. The SIB is a set of associated system information. For example, one SIB may include only information of a peripheral cell, and another SIB may include only information of an uplink radio channel used by the UE.

Figure 4:
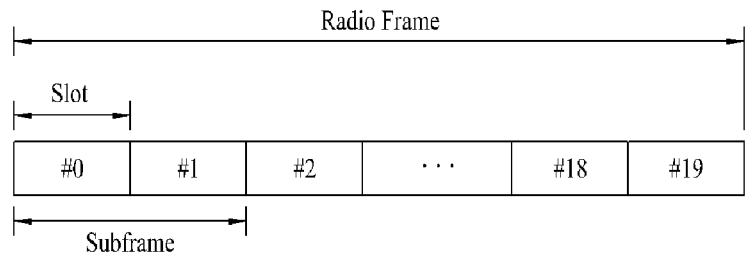
FIG. 4 is a diagram illustrating a structure of a radio frame according to the present invention.

FIG. 4 is a diagram illustrating a structure of a radio frame according to the present invention. Referring to FIG. 4, the radio frame includes 10 subframes, each of which includes two slots. The time required to transmit one subframe will be referred to as a transmission time interval (TTI). One subframe corresponds to 1 ms, and one slot corresponds to 0.5 ms. One slot includes a plurality of orthogonal frequency division multiplexing (OFDM) symbols in a time domain, and a plurality of resource blocks (RBs) in a frequency domain. The structure of the radio frame in FIG. 4 is only exemplary, and various modifications can be made in the number of subframes included in the radio frame or the number of slots included in the subframe, or the number of OFDM symbols included in the slot.

Figure 5:
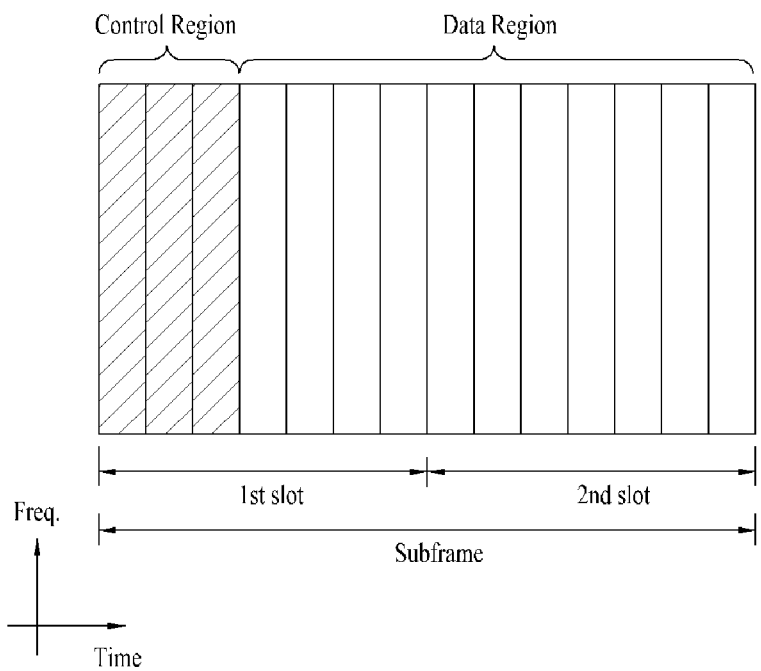
FIG. 5 is a diagram illustrating a structure of a downlink subframe according to the present invention.

FIG. 5 is a diagram illustrating a structure of a downlink subframe according to the present invention. Referring to FIG. 5, the subframe includes two slots in a time domain. Maximum three OFDM symbols from the front of the first slot in the subframe are used as a control region to which a physical downlink control channel (PDCCH) is allocated, and the other OFDM symbols are used as a data region to which a physical downlink shared channel (PDSCH) is allocated. The control information transmitted through the PDCCH is designated as downlink control information (DCI). The DCI includes uplink resource allocation information, downlink resource allocation information, uplink transmit power control (TPC) command of random user equipment groups. The PDCCH can carry resource allocation information and transport format of the DL-SCH, resource allocation information (UL-SCH) of the UL-SCH, paging information through a paging channel (PCH), system information through the DL-SCH, resource allocation information on upper layer control message such as random access response transmitted on the PDSCH, a set of transmission power control commands of individual user equipments (UEs) within a random user equipment group, and activity information of voice over Internet protocol (VoIP) and transmission power control command. The eNB determines a PDCCH format in accordance with DCI to be transmitted to the user equipment, and attaches cyclic redundancy check (CRC) to the control information. The CRC is masked with a unique identifier (for example, a radio network temporary identifier (RNTI)) in accordance with owner or purpose of use of the PDCCH. If the PDCCH is for a specific user equipment, the CRC can be masked with a unique identifier (for example, cell-RNTI (C-RNTI) of the user equipment. If the PDCCH is for a paging message, the CRC can be masked with a paging indicator identifier (for example, paging RNTI (P-RNTI)). If the PDCCH is for system information, the CRC can be masked with a system information identifier (for example, system information-RNTI (S-RNTI)). The CRC can be masked with a random access-RNTI (RA-RNTI) to indicate a random access response corresponding to a response to reception of a random access preamble.

Figure 6:
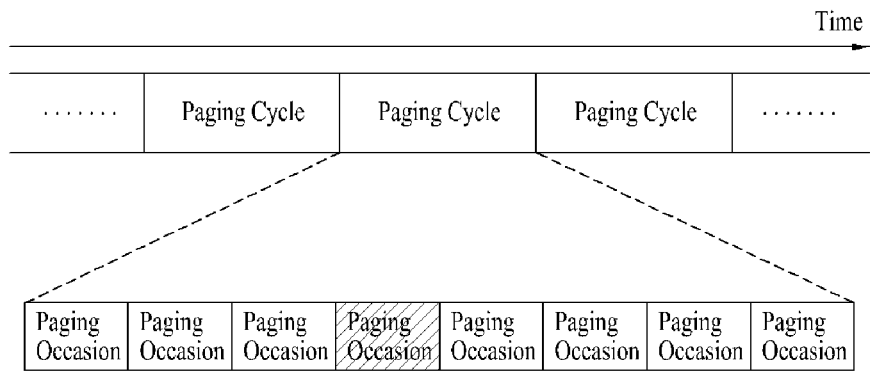
FIG. 6 is a diagram illustrating a receiving structure of a paging message in an user equipment according to one embodiment of the present invention.

FIG. 6 is a diagram illustrating a receiving structure of a paging message in an user equipment according to one embodiment of the present invention. Referring to FIG. 6, when receiving a paging message, the UE can perform discontinuous reception (DRX) to reduce power consumption. To this end, the eNB may configure a plurality of paging occasions per timing period called a paging cycle or DRX cycle, and a specific UE is configured to receive the paging message for a designated paging occasion only and not to receive the paging message for the other paging occasion. One paging occasion may correspond to one transmission time interval (TTI). The UE can receive a downlink channel per designated paging occasion. In more detail, if the user equipment (UE) receives a physical downlink control channel (PDCCH) having a paging identifier (for example, paging-radio network temporary identifier (P-RNTI)) by waking up at the designated paging occasion, it can receive the paging message through the physical downlink shared channel (PD-SCH) indicated by the control information within the received PDCCH. The user equipment (UE) identifies whether its identifier (for example, international mobile subscriber identity (IMSI)) exists in the paging message. If so, the user equipment (UE) informs an upper layer that the paging message has been arrived. The paging message may be used by the eNB to discover and wake up the corresponding UE if there are either data to be transmitted to the UE or call arrived therein. At this time, the eNB may transmit the paging message, which includes a system information change indicator, to the UE to notify whether the system information has been changed, and the UE may receive the paging message on the designated paging occasion. In the mean time, the aforementioned MTC device is a communication device that performs communication between devices. There is no great difference between the MTC device and the UE except that communication is performed between devices excluding person. In other words, the MTC device may correspond to the UE excluding person. However, if a method of receiving and transmitting a message (for example, paging message) in and from a UE involved with person is applied to the MTC device, a problem may occur. Hereinafter, a structure and a communication process of the MTC device will be described with reference to FIG. 7. Also, a problem that may occur when the method of receiving and transmitting a paging message in and from a UE involved with person is applied to the MTC device will be described in brief.

Figure 7:
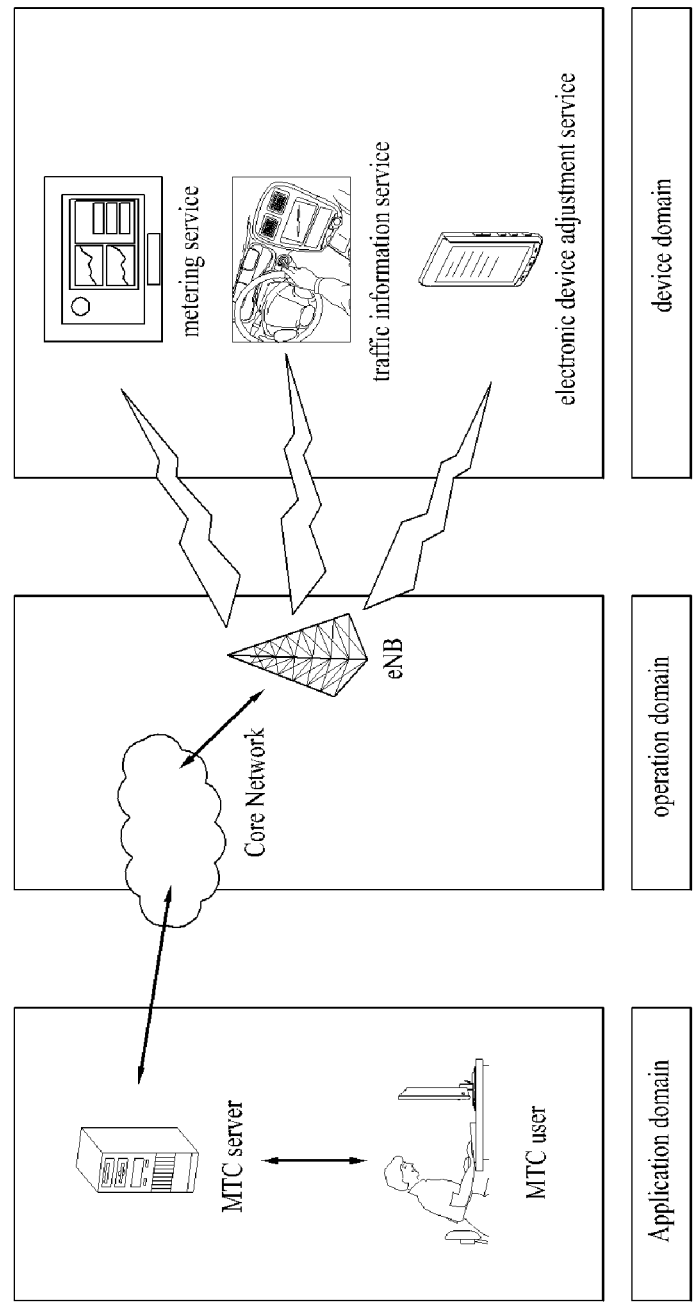
FIG. 7 is a diagram illustrating a structure and a communication process of a MTC device according to the present invention.

FIG. 7 is a diagram illustrating a structure and a communication process of a MTC device according to the present invention. Referring to FIG. 7, if a metering service, a traffic information service, or a user electronic device control service, which provided through the MTC device, is received in the eNB, the eNB can transmit the received service to a MTC server, whereby an MTC user can use the service provided through the MTC server.

In the mean time, the MTC device is likely to perform communication by itself at a place not involved with person, in view of its feature. Accordingly, a power supply to the MTC device may not be available, or there may be inconvenience in a power supply to the MTC device. In this respect, power consumption of the MTC device should be minimized. At this time, if the method of receiving and transmitting a paging message, which is applied to the UE, is applied to the MTC device, power consumption of the MTC device may be increased due to a short paging cycle. In other words, increase of power consumption may be a big problem to the MTC device that is difficult to access a power supply source. In order to solve this problem, if the paging cycle becomes long, power consumption can be reduced. However, if reception of a paging message is failed for a paging occasion, it may be a problem in view of stability of the MTC device due to a long period to next paging occasion. This problem does not occur only in the procedure of receiving and transmitting a paging message but may occur in reception and transmission of all messages of the MTC device. Hereinafter, a method of receiving and transmitting a message to minimize power consumption in a MTC device will be described in detail. As one example of a method of receiving and transmitting a message in an MTC device, a method of receiving and transmitting a paging message will be described. However, it is to be understood that the present invention is not limited to the method of receiving and transmitting a paging message and can be applied to a method of receiving and transmitting other message.

Figure 8:
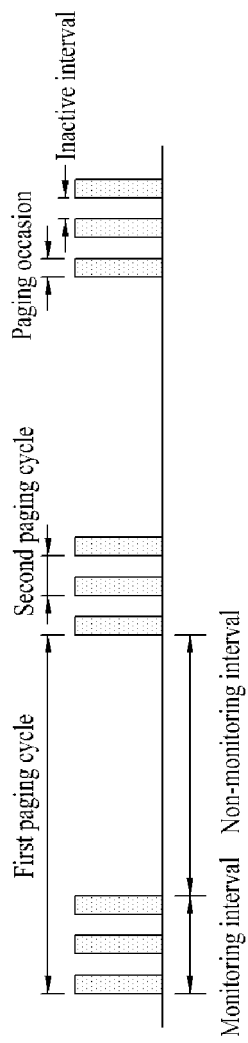
FIG. 8 is a diagram illustrating a transmission structure of a paging message in a MTC device according to one embodiment of the present invention.

FIG. 8 is a diagram illustrating a transmission structure of a paging message in a MTC device according to one embodiment of the present invention. Referring to FIG. 8, a first paging cycle may include a monitoring interval and a non-monitoring interval. The monitoring interval can include a plurality of active intervals and a plurality of inactive intervals. The active interval may correspond to the paging occasion. The eNB may set two paging cycles, i.e., first paging cycle and second paging cycle for MTC devices. The first paging cycle may be set to be longer than the second paging cycle. Also, the paging cycle can be set to correspond to an integer multiple of the second paging cycle. The eNB can repeatedly transmit the paging message for the MTC device in accordance with the second paging cycle within the first paging cycle. Also, the paging message can repeatedly be transmitted as much as the number of predetermined times within the first paging cycle. Nmax means the number of maximum repetition times of paging occasion predetermined in the monitoring interval, and may be set variously considering features of the MTC device. The eNB can transmit system information, which includes information on Nmax. In the mean time, the paging message may be varied per first paging cycle but cannot be varied within the first paging cycle. In other words, the same paging message is repeatedly transmitted at the second paging cycle within the first paging cycle. However, different paging messages may be set to be transmitted at the second paging cycle within the monitoring interval as the case may be. The first paging cycle, the second paging cycle and the paging occasion may be set in the RRC layer of the MTC device. In the mean time, if the MTC device is in the RRC idle state (RRC_IDLE state), the RRC layer can receive the paging message in accordance with the first paging cycle, the second paging cycle and the paging occasion.

Figure 9:
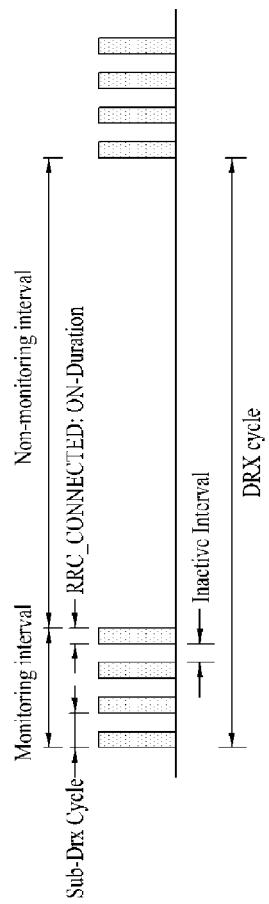
FIG. 9 is a diagram illustrating a structure of a transmission message in a MTC device according to one embodiment of the present invention.

FIG. 9 is a diagram illustrating a structure of a transmission message in a MTC device according to one embodiment of the present invention. Referring to FIG. 9, the MTC device is in the RRC connected state (RRC_Connected state). A DRX cycle of the MAC layer may include a monitoring interval and a non-monitoring interval. The monitoring interval includes an on-duration and an inactive interval, wherein the on-duration may be repeatedly configured at a specific cycle within the monitoring interval. The DRX cycle may correspond to the first paging cycle of FIG. 8, and the on-duration may correspond to the paging occasion of FIG. 8. The inactive interval is an interval where messages cannot be received, and corresponds to an interval except for the on-duration interval (corresponding to paging occasion of FIG. 8) at a sub DRX cycle (corresponding to the second paging cycle of FIG. 8). The monitoring interval corresponds to an interval where messages are monitored by the MTC device within the DRX cycle, and its size may be calculated by $\{(N1max-1) \times sub\ DRX\ cycle + size\ of\ On\text{-}duration\}$. At this time, N1max means the number of maximum repetition times of on-duration predetermined within the monitoring interval.

Figure 10:
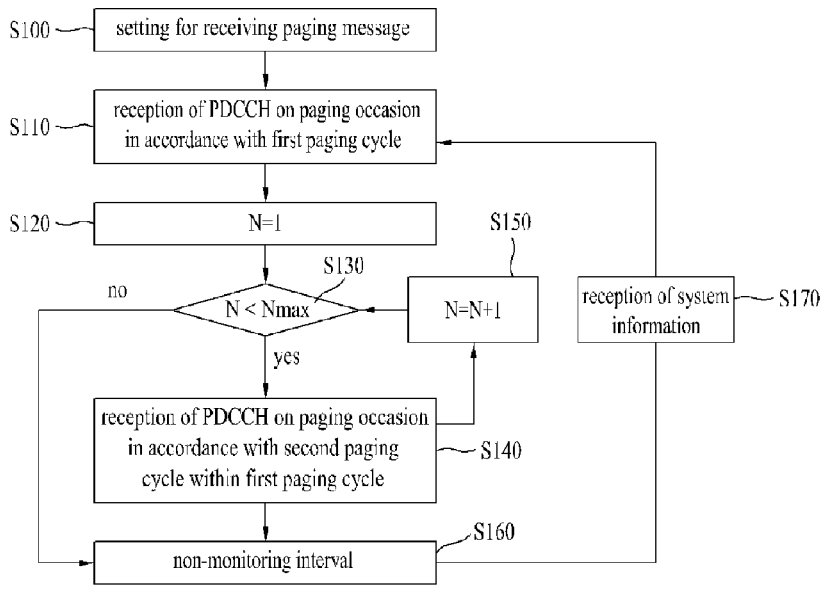
FIG. 10 is a diagram illustrating a method of receiving a paging message in a MTC device according to one embodiment of the present invention.

FIG. 10 is a diagram illustrating a method of receiving a paging message in a MTC device according to one embodiment of the present invention. Referring to FIG. 10, the MTC device receives system information, which includes configuration information for receiving a paging message, from the eNB, and may be set based on the configuration information (S100). The configuration information may be acquired through NAS message or RRC message dedicated for the MTC device. The configuration information may include the first paging cycle, the second paging cycle, the paging occasion, and the number of maximum repetition times of the paging occasion within the monitoring interval (Nmax). The MTC device may monitor at least one subframe on the first paging occasion within the paging cycle and receive the PDCCH (S110, S120). The MTC device may receive the paging message through the PDSCH indicated by the control information through the PDCCH that has the paging identifier (P-RNTI) received in the at least one subframe. At this time, the paging identifier (P-RNTI) may correspond to a paging identifier of the MTC device, a paging identifier of the UE, or a paging identifier of a group to which the user equipment belongs. The MTC device may try to receive the paging message as much as Nmax within the first paging cycle until it receives the paging message (S130). The MTC device may monitor at least one subframe on the paging occasions in accordance with the second paging cycle in the monitoring interval within the first paging cycle, and may receive the PDCCH (S140, S150). The MTC device may receive the paging message through the PDSCH indicated by the control information through the PDCCH that has the paging identifier (P-RNTI) received in the at least one subframe. Even in the case that the MTC device monitors the subframes for the paging occasions as much as Nmax, if the MTC device fails to receive the paging message or its identifier is not included in the received message, it may stop receiving the paging message until next first paging cycle starts (S160). In the mean time, the MTC device may receive the system information from the eNB before trying to receive the PDCCH on the at least one subframe belonging to the paging occasion within the next first paging cycle (S170). The configuration information for receiving the paging message can be included in the system information, and the MTC device may update the configuration information. In the aforementioned procedure, the paging message may include a system information change indicator for the MTC devices together with a system information change indicator for an UE. If the MTC device acquires the system information change indicator for the MTC devices from the paging message, it can receive the system information based on the acquired system information change indicator. The eNB may transmit the paging message in accordance with the first paging cycle, wherein the paging message includes the system information change indicator for the MTC devices. In the mean time, if the MTC device in the RRC idle state (RRC_IDLE state) receives the paging message, and if the identifier of the MTC device is included in the paging message, the MTC device may transmit the RRC connection request message to the eNB. At this time, the MTC device may again receive the system information before transmitting the RRC connection request message. Although FIG. 10 illustrates the method of receiving a paging message, a method of receiving a general message may be performed equally. For example, if the MTC device is in the RRC connected state, it may acquire the configuration information, such as DRX cycle, sub DRX cycle, on-duration, and the number of maximum repetition times (N1max) within the monitoring interval, from the eNB through the RRC message, and may be set based on the acquired configuration information. The MTC device may monitor the at least one subframe on the first on-duration within the DRX cycle, and may receive the PDCCH. The MTC device may receive the related message through the PDSCH indicated by control information through the PDCCH that has an identifier (for example, C-RNTI, TPC-PUCCH-RNT, TPC-PUSCH-RNTI, or semi-persistent scheduling C-RNTI) received in the at least one subframe. If the MTC device fails to receive the related message, if it fails to receive the corresponding PDCCH, or if its identifier is not included in the received message, the MTC device may monitor at least one subframe on the paging occasions in accordance with the sub DRX cycle for the monitoring interval within the DRX cycle, and may receive the PDCCH. In the mean time, if the MTC device receives the message, and if the identifier of the MTC device is included in the received message, the MTC device may stop receiving the message within the corresponding DRX cycle.

Figure 11:
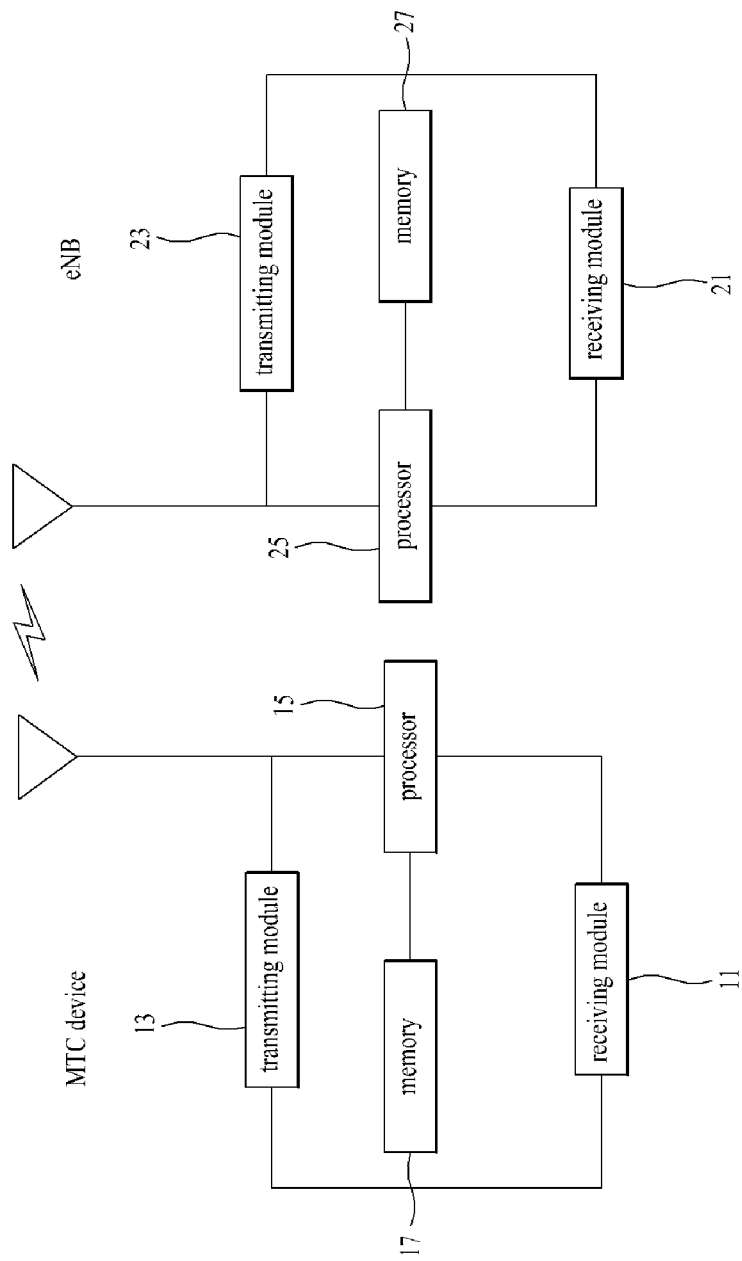
FIG. 11 is a diagram illustrating a configuration of a MTC device and eNB in a mobile communication system according to one embodiment of the present invention.

FIG. 11 is a diagram illustrating a configuration of a MTC device and an eNB in a mobile communication system according to one embodiment of the present invention.

The MTC device may include a receiving module 11, a transmitting module 13, a processor 15 and a memory 17. The receiving module 11 may be configured to receive various signals, data and information from the eNB. The transmitting module 13 may be configured to transmit various signals, data and information to the eNB. The memory 17 may be configured to temporarily store the received various signals, data and information. The processor 15 may be configured to control the receiving module 11 to receive the system information from the eNB. Configuration information for receiving a message may be included in the system information, and the processor 15 may set the MTC device based on the received configuration information. The configuration information may be acquired through RRC message or NAS message. The configuration information may include a first cycle, a second cycle, active occasion, and the number of maximum repetition times Nmax of active occasion within the first cycle. The first cycle may correspond to a first paging cycle when the received message is a paging message. And, the first cycle may correspond to a DRX cycle when the received message is a downlink message of a MAC layer. The second cycle may correspond to a second paging cycle when the received message is a paging message. And, the second cycle may correspond to a sub DRX cycle when the received message is a downlink message of a MAC layer. The active occasion may correspond to paging occasion or on-duration. Nmax may correspond to the number of maximum repetition times of paging occasion within the monitoring interval or the number of maximum repetition times of on-duration within the monitoring interval. The paging message may correspond to the downlink message of the MAC layer in basic receiving structure and cycle size. The processor 15 may monitor at least one subframe on the first active occasion within the first cycle and may receive a related message through the PDSCH indicated by the control information through the PDCCH, which has an identifier in the at least one subframe, by controlling the receiving module 11. If the processor 15 fails to receive the related message by controlling the receiving module 11, if the processor fails to receive the corresponding PDCCH, or if the identifier of the MTC device is not included in the received message, the processor 15 may monitor at least one subframe on the active occasions in accordance with the second cycle within the monitoring interval, and may receive the PDCCH. In the mean time, the processor 15 receives a message, and if its identifier is included in the received message, the processor 15 may stop receiving the message within the corresponding first cycle.

The eNB may include a receiving module 21, a transmitting module 23, a processor 25 and a memory 27. The receiving module 21 may be configured to receive various signals, data and information from the UE and the MTC device. The transmitting module 23 may be configured to transmit various signals, data and information to the UE and the MTC device. The memory 27 may be configured to temporarily store the calculated information, the received various signals, data, etc. The memory 27 may be replaced with a buffer (not shown). The processor 25 may transmit configuration information through the system information or RRC message, wherein the configuration information includes a first cycle, a second cycle, active occasion, and the number of maximum repetition times of the active occasion within the monitoring interval. Also, the processor 25 may transmit control information, which includes an identifier, through the PDCCH on the active occasion based on the first cycle and the second cycle by controlling the transmitting module 23. Also, the processor 25 may transmit a related message based on the control information through the PDSCH by controlling the transmitting module 23.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although it has been described that the aforementioned embodiments of the present invention are applied to a 3GPP LTE based mobile communication system, the embodiments may equally be applied to various mobile communication systems.

The invention claimed is:

1. A method of receiving a message by a wireless device in a mobile communication system, the method comprising:
   obtaining information of a first cycle including a monitoring interval and a non-monitoring interval, information of a second cycle including an active interval and an inactive interval, and information on a maximum repetition number, $N_{max}$, of active intervals within the monitoring interval, wherein the first cycle includes a plurality of second cycles; and
   monitoring at least one active interval within the monitoring interval for receiving the message,
   wherein the message is repeated in accordance with the second cycle within the monitoring interval;
   wherein the monitoring of at least one active interval within the monitoring interval for receiving the message is repeated up $N_{max}$ times, until a specific identifier is acquired within the monitoring interval, and
   wherein the monitoring of at least one active interval is repeated up to $N_{max}$ times within a next monitoring interval, if the specific identifier is not acquired within the monitoring interval.

2. The method of claim 1, wherein the monitoring of at least one active interval includes monitoring a physical downlink control channel (PDCCH) for the message.

3. The method of claim 2, wherein the PDCCH for the message includes an identifier.

4. The method of claim 2, wherein the message is received through a physical downlink shared channel (PDSCH) indicated by the PDCCH for the message.

5. The method of claim 1, wherein the first cycle is a discontinuous reception (DRX) cycle.

6. The method of claim 1, wherein the wireless device is a machine type communication (MTC) device.

7. The method of claim 1, wherein the message is a paging message.

8. A method of transmitting a message in a mobile communication system, the method comprising:
   transmitting, to a wireless device, information of a first cycle including a monitoring interval and a non-monitoring interval, information of a second cycle including an active interval and an inactive interval, and information on a maximum repetition number, $N_{max}$, of active intervals within the monitoring interval, wherein the first cycle includes a plurality of second cycles; and
   transmitting a message to the wireless device via at least one active interval within the monitoring interval,
   wherein the message is repeated in accordance with a second cycle within the monitoring interval,
   wherein the at least one active interval is monitored repeatedly up to $N_{max}$ times within the monitoring interval for receiving by the wireless device, until a specific identifier is acquired within the monitoring interval, and
   wherein the at least one active interval is monitored repeatedly up to $N_{max}$ times within a next monitoring interval, if the specific identifier is not acquired within the monitoring interval.

9. The method of claim 8, wherein the first cycle is a discontinuous reception (DRX) cycle.

10. The method of claim 8, wherein the wireless device is a machine type communication (MTC) device.

11. The method of claim 8, wherein the message is a paging message.

* * * * *